United States Patent [19]

Throp

[11] 4,188,457

[45] Feb. 12, 1980

[54] CLOSURES FOR LIQUID PRODUCT CONTAINERS

[75] Inventor: Arnold M. Throp, Harrow, England

[73] Assignee: Metal Box Limited, Reading, England

[21] Appl. No.: 787,630

[22] Filed: Apr. 14, 1977

[30] Foreign Application Priority Data

Apr. 29, 1976 [GB] United Kingdom ............... 17415/76

[51] Int. Cl.$^2$ ............................................. A23L 3/34
[52] U.S. Cl. ................................... 428/542; 215/362; 215/355; 220/307; 264/45.5; 264/54; 264/DIG. 14; 264/DIG. 83; 426/133; 426/397; 428/158; 521/51; 521/89; 521/149
[58] Field of Search ........ 428/542; 264/45.5, DIG. 5, 264/DIG. 13, DIG. 14, DIG. 83, 54; 260/2.5 R, 2.5 HA; 220/307; 215/362, 261, 355; 426/15, 106, 124, 132, 133, 389, 394, 397; 99/276–277.2

[56] References Cited

U.S. PATENT DOCUMENTS

| | | | |
|---|---|---|---|
| 2,138,712 | 11/1938 | Saffert | 260/2.5 R |
| 2,268,160 | 12/1941 | Miles | 260/2.5 R |
| 2,478,879 | 8/1949 | Ten Broeck | 260/2.5 R |
| 2,771,205 | 11/1956 | Zepelovitch | 215/362 |
| 3,268,636 | 8/1966 | Angell | 264/45.5 |
| 3,954,685 | 5/1976 | Woo | 260/2.5 R |

FOREIGN PATENT DOCUMENTS

1508722 11/1967 France.
2254486 7/1975 France.
1259100 1/1972 United Kingdom.

*Primary Examiner*—John E. Kittle
*Attorney, Agent, or Firm*—Diller, Ramik & Wight

[57] ABSTRACT

A bung for closing a wine bottle in the manner of a cork is formed in a conventional injection-moulding machine from ethylene-vinyl acetate copolymer (EVA) with the addition of sodium metabisulphite and sodium bicarbonate. The sodium metabisulphite, which is in stoichiometric excess in relation to the sodium bicarbonate, decomposes to liberate sulphur dioxide. The sodium bicarbonate decomposes to liberate water and carbon dioxide. The bung as moulded accordingly has a foamed core with a liquid-impervious skin. It contains sulphur dioxide, and water enabling the sulphur dioxide to act as an oxygen scavenger when the bung is in use in a wine bottle. The bung therefore provides the bottle with a long shelf life, with no noticeable tainting of the wine.

22 Claims, 5 Drawing Figures

CLOSURES FOR LIQUID PRODUCT CONTAINERS

This invention relates to closures for liquid product containers, and particularly concerns closures for containers of wine or wine-based products.

Proposals have been made to form bungs for wine bottles from thermoplastics materials. However, the bungs hitherto proposed have apparently had little or no commercial success largely, it is believed, because of their tendency to noticeably taint the product and/or because of the relatively low resistance which they present to oxygen permeation into the container.

The present invention seeks, with suitable arrangement, to provide a closure such that when fitted to a container of wine or a wine-based product it presents a high resistance to oxygen permeation to ensure a long shelf life for the product and yet produces little or no noticeable product tainting.

In accordance with the present invention there is provided a closure for a container of a wine or a wine-based product, of which at least a part intended to contact the product is a moulded structure of thermoplastic material having a foamed core within a liquid-impervious skin, the said structure containing sulphur dioxide and water enabling the sulphur dioxide to act as an oxygen scavenger.

From other aspects the invention provides a feedstock from which the closure or closure part may be moulded, and a method of forming the closure or closure part.

In order that the invention may be more fully understood embodiments thereof will now be described, by way of example, with reference to the accompanying drawings in which.

Figure 4:
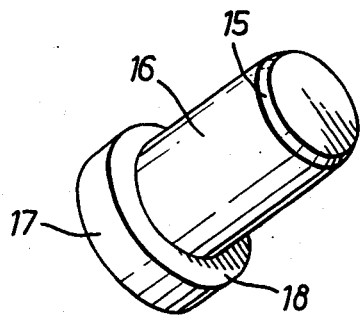
Figure 5:
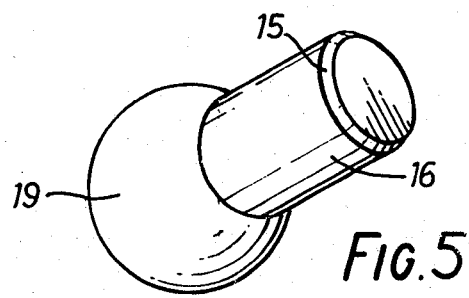

FIG. 4 similarly shows a flanged stopper forming a second embodiment of the invention; and FIG. 5 similarly shows a third embodiment of the invention.

Figure 1:
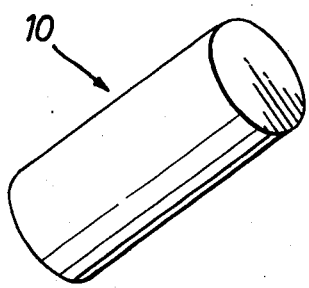
FIG. 1 is a perspective view of a wine bottle bung in accordance with the invention.
Figure 2:
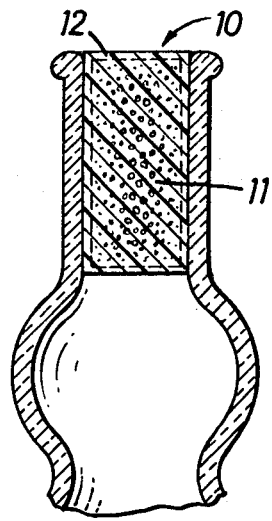
FIG. 2 shows the bung of FIG. 1 in central vertical section and when in use to close a wine bottle neck.

Referring now to the FIGS. 1 and 2, the bung 10 forming the first embodiment of the invention has the cylindrical shape usual for wine bottle corks. It is formed of plastics material as explained below and comprises a foamed core 11 of closed-pore structure within a smooth liquid-impervious skin 12, as shown in FIG. 2.

The bung is formed by conventional injection-moulding techniques using as feed stock a mixture having the following composition by weight:

Sodium Metabisulphite: 2%
Sodium Bicarbonate: 1%
Pigment: 1%
EVA: Balance to 100%

In the feed stock for the injection-moulding machine these substances are in particulate form and admixed together, possibly with an addition of a small amount (e.g., 0.1%) of a viscous liquid to assist blending if the particle sizes differ very substantially. In known manner the feed stock is heated and forced through a nozzle into a mould cavity of the appropriate size and shape, in a sufficient quantity so as initially only partly to fill the cavity.

The heating of the feed stock causes the following decomposition reactions of the sodium metabisulphite and the sodium bicarbonate:

$$Na_2S_2O_5 \rightarrow Na_2SO_3 + SO_2 \qquad (1)$$

$$2NaHCO_3 \rightarrow Na_2CO_3 + H_2O + CO_2 \qquad (2)$$

The following secondary reaction takes place between the reaction products of reactions (1) and (2) above:

$$Na_2CO_3 + SO_2 \rightarrow Na_2SO_3 + CO_2 \qquad (3)$$

Thus the overall reaction, formed by combining reactions (1), (2) and (3), is as follows:

$$Na_2S_2O_5 + 2NaHCO_3 \rightarrow 2Na_2SO_3 + H_2O + 2CO_2 \qquad (4)$$

The sodium metabisulphite, however, is in stoichiometric excess in relation to the sodium bicarbonate, so that in addition to the reaction products of reaction (4), the bung after moulding contains, in addition, the reaction products of reaction (1). The reason for this will become apparent below.

The release of pressure occuring when the molten extrudate passes through the nozzle and into the mould cavity allows the carbon dioxide and, to a lesser extent, the water and sulphur dioxide produced by reactions (1) and (4) to become active and so form bubbles in the EVA material (Ethylene-vinyl acetate copolymer) within the mould cavity. In known manner the EVA material is therefore expanded so as to fill the cavity. As an alternative, the cavity may be of smaller volume than the required final volume and may be expanded to the final volume as foaming is taking place.

During the filling of the mould cavity as described, any EVA material which comes into contact with the cavity walls is rapidly chilled, the chilling having the effect of locally suppressing foaming. Thus, after cooling and solidification and subsequent removal from the mould cavity, the bung is formed, as previously mentioned, of a foamed core 11 of closed pore structure within a smooth, liquid-impervious skin 12.

The injection-moulding process may be arranged so that only part of the decomposition of the sodium metabisulphite and/or the sodium bicarbonate occurs before the extrudate passes through the nozzle, the remainder of the decomposition occurring within the mould cavity itself. The residual sodium metabisulphate and/or sodium bicarbonate passing into the mould cavity can then act as a nucleating agent for ensuring fine and well dispersed bubbles throughout the core 11. Alternatively, it may be possible to rely on the sodium sulphite to provide nucleation.

The water produced by the decomposition of the sodium bicarbonate is in vapour form until the temperature of the bung material falls below 100° C. during cooling. Collapse of the moulding at this time due to the condensation of the water vapour and the resulting reduction of the internal pressure of the bung is prevented by the carbon dioxide and, to a lesser extent, the sulphur dioxide produced by reactions (4) and (1) as described. Together these reaction products represent a substantial proportion (e.g., at least three-quarters) of the void volume of the bung material, even before condensation of the water vapour occurs. It will be noted in this respect that one half of the carbon dioxide is contributed by secondary reaction (3) above, the other half being contributed directly by reaction (2).

In addition to its subsidiary function as a foaming agent as described above, a more important function of the free sulphur dioxide produced by reaction (1) as described above is provided in use of the bung, when, as shown in FIG. 2, the bung is located in the neck of a wine bottle in the manner of a conventional cork. During the time that the bung is in position the sulphur dioxide which it contains acts, in the presence of the water from reaction (2), as a reducing agent to scavenge any oxygen passing into the bung not only from atmosphere but also from the headspace in the bottle. Little or no oxygen is therefore allowed to pass from atmosphere into the wine in the bottle; moreover, a low oxygen concentration level in the headspace and the wine is ensured. The bottle is thereby given a long potential shelf life.

In thus performing its function to provide the bung with a high resistance to permeation of oxygen into the bottle, the sulphur dioxide undergoes the following reaction:

$$2SO_2 + O_2 + 2H_2O \rightarrow 2H_2SO_4 \quad (5)$$

The sulphuric acid produced within the bung by this reaction may, during the course of time, find its way via the bottle headspace to the wine in the bottle. However, wines (and wine-based products) naturally contain sulphuric acid, and this further sulphuric acid merely increases the sulphuric acid concentration of the wine to an extent which is insignificant and readily acceptable to the user.

Some of the sulphur dioxide in the bung may pass directly to the headspace and to the wine without undergoing reaction (5). In the wine this free sulphur dioxide exists in aqueous solution as what is sometimes referred to as sulphurous acid ($H_2SO_3$). This is again a natural and, indeed, highly desirable component of wines and wine-based products in that it acts as a reducing agent to scavenge any free oxygen which may have been left in the wine and the headspace by the bottling operation. The reaction product of this scavenging operation is sulphuric acid and so again is acceptable to the user.

In addition to its oxygen scavenging properties as described above, the sulphur dioxide produced within the bung by reaction (1) also acts as a continuing sterilant preventing the growth of harmful organisms on and within the bung.

It is to be noted that sulphur dioxide is accepted as a food additive for general use and is a commonly used preservative for wines.

Figure 3:
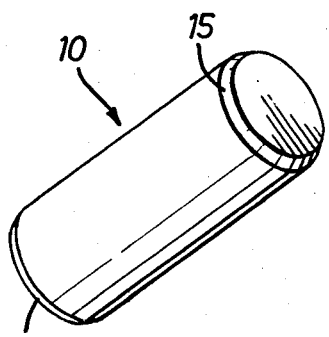
FIG. 3 is a perspective view of the bung of FIG. 1 in a modification.

The EVA material of which the bung is made together with the foamed core 11 together provide the bung with a high degree of compressibility and resilience; the bung is therefore able to accommodate substantial manufacturing tolerances of the bottle neck without loss of sealing efficiency. It may be inserted in the bottle neck using conventional corking equipment. To assist entry of the bung into the bottle mouth the bung may be chamfered at one or both of its ends, as manifest by the modification of FIG. 3 in which a chamber 15 is provided at each end of the bung.

Removal of the bung to open the bottle may be effected by a corkscrew in the usual way. Moreover, as with a conventional cork, the bung may be used to reclose the bottle as and when desired.

It is believed that the voids formed within the bung as described above should occupy between about 30-70% of the bung volume. Below 30% the bung is likely to be insufficiently deformable and resilient to satisfactorily accommodate the manufacturing tolerances to which the bottle neck is made; above 70% the skin 12 will probably be too thin, and therefore insufficiently rigid, to permit successful insertion of the bung into the bottle neck initially and for reclosure if desired.

The invention is in no way limited to the substances used in the manufacture of the described embodiments, and amongst the alternatives which are possible are: to employ a compound other than sodium metabisulphite for producing the sulphur dioxide necessary to enhance resistance to oxygen permeation; to employ a compound other than sodium bicarbonate for producing water to enable the sulphur dioxide to act as a reducing agent as required; and to employ one or more agents specifically for effecting foaming. By suitable choice it is believed possible to achieve the production of the sulphur dioxide and of the water for activating it from a single compound.

Instead of sodium metabisulphite the metabisulphite of another alkali metal (e.g., potassium) may be used. However, sodium metabisulphite is preferred because of its ready availability, relative cheapness and stability. Likewise, bicarbonates other than sodium bicarbonate are possible. As a further alternative to sodium bicarbonate, hydrated sodium citrate, provided for its ability to liberate water of crystallisation, may be combined with a suitable agent to achieve foaming.

Although in the described embodiments EVA is used as the base material because of its inherent softness and flexibility, this is not essential; other thermoplastic materials may be used, with or without a hardness-modifying additive. A thermoplastic material used for the base material may be used alone or in combination with other thermoplastic materials; it may be a homopolymer or a copolymer. One possible alternative to EVA is low density polyethylene with the addition of ethylene/propylene rubber and/or polyisobutylene to reduce its hardness.

The invention is not limited in application to bungs for wine bottles as particularly described, but may have general application to closures for containers of wines or wine-based products such as sherry, port, madeira. A closure in accordance with the invention may, for example, be in the form of a simple bung (FIGS. 1, 2 and 3) or a stopper (FIGS. 4 and 5). In each application the present invention is used for the manufacture of at least that part of the closure which in use is in contact with the wine or wine-based product.

FIG. 4 illustrates the application of the invention to a flanged stopper. The stopper has a chamfered bung portion 16 dimensioned for insertion in the mouth of a bottle of sherry, port or the like, and an enlarged diameter flanged end portion 17 which is intended to engage against the terminal end of the bottle mouth at an annular undersurface 18. The bung portion 16 is made exactly as previously described in relation to the first embodiment. The flanged end portion 17 is made separately from the bung portion and is typically of an unfoamed and generally rigid thermoplastic material such as high density polyethylene. It has a central recess in which part of the bung portion is received and glued in position. It may be externally knurled to assist gripping.

FIG. 5 shows a further stopper which is a modification of the stopper of FIG. 4 with a spherical knob 19 substituted for the flanged end portion 17.

An application of the invention which is in addition to those mentioned above is for the manufacture of bungs of the kind which are commonly used in laboratories and domestic wine making for fitting airlocks or the like to demi-johns. For an application such as this the bungs are moulded with axially directed holes. Such a bung may also form part of a dispensing device of the kind which for use is sealingly inserted in the neck of a bottle, for example an optic for the retailing of distilled spirits and the like.

What we claim is:

1. In a closure for a container of a wine or a wine-based product, at least a part of said closure intended to contact the product being in the form of a moulded stopper of a thermoplastics material having a foamed core within a liquid-impervious skin, the improvement comprising the feature that the foamed core has been produced by blowing the thermoplastics material with a blowing agent including a thermally decomposable metabisulphite and a water-producing compound, whereby said foamed core contains sulphur dioxide and water enabling the sulphur dioxide to act as an oxygen scavenger.

2. A closure according to claim 1, wherein the metabisulphite is the metabisulphite of an alkali metal.

3. A closure according to claim 2, wherein the metabisulphite of an alkali metal is sodium metabisulphite.

4. A closure according to claim 1, wherein the said water-producing compound is a bicarbonate.

5. A closure according to claim 4, wherein the bicarbonate is sodium bicarbonate.

6. A closure according to claim 1, wherein the thermoplastics material is an ethylene-vinyl acetate copolymer.

7. A closure according to claim 1, wherein the thermoplastics material comprises polyethylene.

8. A closure according to claim 1 wherein the said part further contains an agent for modifying the hardness of the thermoplastics material.

9. In a bung for a wine bottle, which is a moulded structure of thermoplastic material having a foamed core within a liquid-impervious skin, the improvement comprising the feature that the foamed core has been produced by blowing the thermoplastics material with a blowing agent including a thermally decomposable metabisulphite and a water-producing compound, whereby said foamed core contains sulphur dioxide and water enabling the sulphur dioxide to act as an oxygen scavenger.

10. In a feedstock for a moulding machine which comprises, in particulate form, a thermoplastic material and a blowing agent such that the feedstock is mouldable to produce a stopper having a foamed core within a liquid-impervious skin, the improvement which resides in that the blowing agent includes a metabisulphite capable of thermal decomposition during moulding to produce sulphur dioxide, and a compound capable during moulding of liberating water, whereby the foamed core produced on moulding the stopper contains sulphur dioxide and water enabling said sulphur dioxide to act as an oxygen scavenger.

11. A feedstock according to claim 10, wherein the water-liberating compound is also capable of liberating a gas by thermal decomposition during moulding.

12. A feedstock according to claim 11, wherein the water-liberating compound is a bicarbonate.

13. A feedstock according to claim 10, wherein the metabisulphite is sodium metabisulphite, and the water-liberating compound is sodium bicarbonate, the sodium metabisulphite being substantially in stoichiometric excess in relation to the decomposition equation:

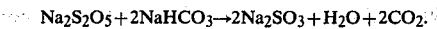
$$Na_2S_2O_5 + 2NaHCO_3 \rightarrow 2Na_2SO_3 + H_2O + 2CO_2.$$

14. A feedstock according to claim 10, wherein the thermoplastic material is an ethylene-vinyl acetate copolymer.

15. A feedstock according to claim 10, wherein the blowing agent also includes a further foaming agent in addition to the metabisulphite and the water-liberating compound.

16. In a method of forming a stopper for providing at least part of a container closure for wine or a wine-based product, which method comprises the steps of injecting through a nozzle and into a mould cavity a molten extrudate which comprises a thermoplastic material and a blowing agent which is at least partially thermally decomposed prior to passage through the nozzle so as to produce at least one gas operative on the reduction of pressure occuring when the extrudate enters the mould cavity to produce a foamed core for the stopper, and causing the extrudate to cool and solidify within the mould cavity to produce a liquid-impervious skin surrounding said foamed core, the improvement which resides in including in the blowing agent a metabisulphite which produces sulphur dioxide by thermal decomposition in said molten extrudate and a compound which liberates water in said molten extrudate, whereby the foamed core produced on moulding the stopper contains sulphur dioxide and water enabling said sulphur dioxide to act as an oxygen scavenger.

17. A method according to claim 16, wherein at least one of the said metabisulphite and water-liberating compounds is only partially decomposed prior to passage through the nozzle so as to provide nucleation for the foaming operation in the mould cavity.

18. The method of making a stopper for providing at least part of a container closure for wine or a wine-based product, which comprises the steps of:
(a) providing a particulate feedstock comprising thermoplastic material and thermally decomposable material which liberates a blowing agent which is at least in part sulphur dioxide and water;
(b) heating and pressurizing said feedstock to melt the feedstock and initiate the thermal decomposition of said thermally decomposable material and extruding a limited amount of the molten feedstock into a mold cavity whereby said blowing agent expands the thermoplastic material; and then
(c) recovering from the mold cavity a stopper which has a foamed core of closed pore structure within a smooth, liquid-impervious skin, the amount of molten extrudate introduced into the mold cavity in step (b) being such that the voids formed by said closed pore structure occupy between about 30–70% of the stopper volume and contain, in situ, sulphur dioxide in the presence of sufficient water to scavenge oxygen permeating into said core by reacting therewith to form sulphuric acid.

19. A stopper made by the method of claim 18.

20. The method as defined in claim 18 wherein said thermally decomposable material includes at least two compounds which thermally decompose and react to liberate sulphur dioxide, water and carbon dioxide.

21. A stopper for providing at least part of a container closure for wine or a wine-based product, which comprises thermoplastic material having a foamed core of closed pore structure within a smooth, liquid-impervious skin, the voids of said foamed core containing, in situ, sulphur dioxide in the presence of sufficient water to scavenge oxygen permeating into said formed core by reacting therewith to form sulphuric acid and such voids constituting about 30–70% of the volume of said stopper.

22. The method of protecting wine or a wine-based product from the deleterious action of oxygen, which comprises the steps of providing a stopper of thermoplastic material having a foamed core of closed pore structure within a smooth, liquid-impervious skin, the voids of said foamed core containing, in situ, sulphur dioxide in the presence of sufficient water to scavenge oxygen permeating into said foamed core by reacting therewith to form sulphuric acid, and closing off a container having said wine or product therein by insertion of said stopper.

* * * * *